(12) United States Patent
Wang

(10) Patent No.: US 11,120,178 B2
(45) Date of Patent: Sep. 14, 2021

(54) VIRTUAL REALITY SYSTEM FOR DESIGNING BRASSIERE

(71) Applicant: Xiamen Brana Design Co., Ltd., Fujian (CN)

(72) Inventor: Zhongtang Wang, Fujian (CN)

(73) Assignee: XIAMEN BRANA DESIGN CO., LTD., Fujian (CN)

(*) Notice: Subject to any disclaimer, the term of this patent is extended or adjusted under 35 U.S.C. 154(b) by 269 days.

(21) Appl. No.: 16/440,967

(22) Filed: Jun. 13, 2019

(65) Prior Publication Data

US 2020/0004906 A1   Jan. 2, 2020

(51) Int. Cl.
| | |
|---|---|
| G06F 30/20 | (2020.01) |
| A41C 3/10 | (2006.01) |
| G06F 3/01 | (2006.01) |
| G06F 3/16 | (2006.01) |
| G06N 5/04 | (2006.01) |
| G06F 113/12 | (2020.01) |

(52) U.S. Cl.
CPC ............ *G06F 30/20* (2020.01); *A41C 3/105* (2013.01); *G06F 3/013* (2013.01); *G06F 3/167* (2013.01); *G06N 5/048* (2013.01); *G06F 2113/12* (2020.01)

(58) Field of Classification Search
None
See application file for complete search history.

(56) References Cited

U.S. PATENT DOCUMENTS

2016/0316849 A1* 11/2016 McLeod ............... A43B 21/24

* cited by examiner

*Primary Examiner* — Craig C Dorais
(74) *Attorney, Agent, or Firm* — Raymond Y. Chan; David and Raymond Patent Firm

(57) ABSTRACT

Disclosed is a virtual reality system for designing brassiere including a wearable device, a head-mounted device, a cloud server, an intelligent terminal, an application program and a designer, thus making it possible for a user to experience the effects of tightened or loosened brassiere, uplifting, compression, enlargement of the breast, and breast massage in a virtual reality environment with physical interaction with objects in real world. Afterwards, relevant data will be transferred to a cloud server via a built-in transducer, and an expected brassiere will be designed.

11 Claims, 6 Drawing Sheets

VIRTUAL REALITY SYSTEM FOR DESIGNING BRASSIERE

CROSS-REFERENCE TO RELATED APPLICATIONS

The present application claims the benefit of Chinese Patent Application No. 201810748446.0 filed on Jun. 29, 2018. The contents of the above are hereby incorporated by reference.

FIELD OF THE INVENTION

The present invention relates generally to fashion design, and more particularly, to a system for designing brassiere based on virtual reality technology.

BACKGROUND OF THE INVENTION

Statistics showed that 80% of women of developed countries in Europe and America wore incorrectly sized brassiere. Similarly, this phenomenon also applied in developing countries, so made-to-measure brassiere may solve this problem.

Women always expect to wear correctly sized and charming brassiere designed by themselves on any occasion. However, it is difficult for a woman to communicate her ideas and thoughts with the designer. In the mean time, women are usually not familiar with how to design a brassiere.

But now, basing on virtual reality technology, it is possible to design an expected personalized brassiere by experiencing immersion into a simulation environment of three dimensional dynamic vision with physical interaction with objects, in which the user can select wearing scene and match clothing by applying a brassiere design application program and using a smart mobile terminal.

However, as a bra cup is vital to fitness of a brassiere, physical objects are still required for simulating wearing effect of the brassiere, so as to guide the design of the brassiere.

SUMMARY OF THE INVENTION

Described herein is a virtual reality system for designing brassiere, which makes it possible for a user to experience the effects of tightened or loosened brassiere, uplifting, compression, enlargement of the breast, and breast massage in a virtual reality environment with physical interaction with objects in real world. Afterwards, relevant data will be transferred to a cloud server via a built-in transducer, and an expected brassiere will be designed.

To achieve the goals, the virtual reality system for designing brassiere comprises a wearable device, a head-mounted device, a cloud server, an intelligent terminal, an application program and a designer.

The wearable device is a bra-like wearable device comprising bra cups, top bindings, bottom bindings, side wings, shoulder straps, back wings and independently controllable air charging-discharging mechanisms.

The bra cup comprises a main body, an external air bag arranged on an external surface of the main body, and an array of internal air bags arranged on an internal surface of the main body. The bra cup has different sizes and models.

The main body is made of silicone rubber. Hardness of the silicone rubber ranges from 50 to 70. Thickness of the main body ranges from 0.5 mm to 2 mm.

The external air bag is arranged on the external surface of the main body. A wall of the external bag is made of polyurethane rubber. Thickness of the wall of the external air bag ranges from 0.05 mm to 0.1 mm. The external air bag is connected to the independently controllable air charging-discharging mechanism. A displacement sensor and a space positioning sensor are internally arranged on a front side of the wall of the external air bag. The displacement sensor and the space positioning sensor are configured to simulate the effects of breast enlargement and breast asymmetry correction. A pressure sensor, a heart rate sensor and a respiration sensor are internally arranged on a back side of the wall of the external air bag. The pressure sensor, the heart rate sensor and the respiration sensor are configured to monitor the wearable device's influence on cardiopulmonary function of the user.

The array of internal air bags is arranged on the internal surface of the main body. Diameter of the internal air bag ranges from 5 mm to 20 mm. A wall of the internal air bag is made of polyurethane rubber. Thickness of the wall of the internal air bag ranges from 0.02 mm to 0.05 mm. The internal air bag is connected to the independently controllable air charging-discharging mechanism. A pressure sensor, a displacement sensor and a space positioning sensor are internally arranged on a back side of the wall of the internal air bag. The pressure sensor, the displacement sensor and the space positioning sensor are configured to simulate the effects of tightened or loosened brassiere, uplifting, compression, enlargement of the breast, and breast massage.

The top bindings, bottom bindings, side wings, shoulder straps and back wings are made of elastic fabric and are internally arranged with pressure sensors configured to record data related to the force applied on corresponding parts of the user's body. By combining the data and lengths of the top bindings, bottom bindings, side wings, shoulder straps and back wings, it is possible to calculate suitable sizes of the top bindings, bottom bindings, side wings, shoulder straps and back wings for the user through specific algorithm.

The independently controllable air charging-discharging mechanism comprises a power supply, a control circuit, an air pump and an air channel. The control circuit receives instruction from the user via a wireless communication module, and controls the air pump, so as to charge or discharge the external air bag and the internal air bags.

The head-mounted device comprises a smart display helmet, a pair of smart glasses and accessories.

The smart terminal may be a smart phone, a smart tablet, a computer, a smart household appliance, a smart car, a smart mirror or a piece of intelligent furniture.

The cloud server is configured to provide stored data, process data collected by the wearable device and the head-mounted device, match scene, transfer data, encrypt data and produce a brassiere design plan for the user.

The application program comprises a virtual reality application program and a smart terminal application program. The virtual reality application program is configured to establish and update database of space scenes and wearing scenes. The space scenes may be bedroom, living room, ballroom, office, workshop, grassland, beach or transport scene. The wearing scenes may be swimwear, underwear, night skirt, dress, skirt, business suit or cheongsam. The smart terminal application program is configured to collect 3D human body data of the user and communicate with a designer and a manufacturer. The 3D human body data comprises height, weight, age, somatotype, BWH (bust, waist, hip) measurements and breast type.

The designer may be a human designer or an artificial intelligence designer, who assists the user with the brassiere design, e.g. brassiere structure optimizing, selection of material, color, pattern and accessories.

Further, an electrode chip is internally arranged on the back side of the wall of the internal air bag. The electrode chip comprises a power supply, a circuit, an electrode and a control chip. The electrode chip touches skin of the user's breast and simulates the effects of water permeation, air permeation, sweating, and high or low body temperature.

Further, the wearable device connects with the head-mounted device via the wireless communication module, so as to realize user-machine interaction. The user-machine interaction may be achieved by voice, gesture, eye tracking or brain-machine interface.

Further, the displacement sensor and the space positioning sensor internally arranged on the front side of the wall of the external air bag output data and receive data related to characters of an external half of the bra cup, while the pressure sensors, the displacement sensors and the space positioning sensors internally arranged on the back sides of the walls of the internal air bags output data and receive data related to characters of an internal half of the bra cup. The data related to characters of the external half and the internal half of the bra cup enables establishment of a 3D model of the bra cup, e.g. relatively thin bra cup, moderately thick bra cup, bra cup with relatively thin upper part and relatively thick lower part, bra cup with relatively thin upper part, relatively thick lower part and relatively thick side edge.

Further, the virtual reality application program comprises the step of inviting the designer or friends to enter the virtual reality environment and assist with the brassiere design, wherein the designer or friends wear the head-mounted device or use the mobile smart terminal to realize user-machine interaction by means of wireless communication connection and assist with the brassiere design.

Further, the virtual reality application program comprises an intelligent recommendation module and a demand-based fuzzy recommendation module. Through specific algorithm, the intelligent recommendation module recommends one or more brassiere design plans for the user based on data, e.g. the 3D human body data provided by the user, the user's previous brassiere design data, data related to the user's online purchased brassiere, selected space scene and selected wearing scene. The demand-based fuzzy recommendation module recommends one or more brassiere design plans for the user based on the user's demand. The user can express her demand by voice, gesture, eye tracking, text entry, image entry or image recognition. The demand may relate to style, factor, meaning and conception of the brassiere design.

Further, the smart terminal application program comprises the step that the user shares the brassiere design, requests for advice from friends, participates in a brassiere design competition and releases bidding information, and steps of finishing the entrusted brassiere design project and manufacturing the brassiere.

Further, the procedure of designing an expected brassiere comprises the following steps.

S1: downloading the application program via the smart terminal and signing a registration agreement;

S2: uploading fundamental body parameters and sending demand for brassiere design;

S3: receiving the wearable device and the head-mounted device in suitable size, or going to a physical store providing the wearable device and the head-mounted device;

S4: wearing the wearable device and the head-mounted device to enter the virtual reality environment;

S5: realizing user-machine interaction; by precisely controlling the independently controllable air charging-discharging mechanisms connected to the internal air bags and the external air bags of the wearable device, gathering data collected by each sensor, sending the data to the cloud server and establishing the 3D model of the bra cup of the expected brassiere through specific algorithm;

S6: adjusting the top bindings, bottom bindings, side wings, shoulder straps and back wings of the wearable device to suitable sizes, and requiring relevant data thereof;

S7: simulating body movements, e.g. standing, sitting, lying, squatting, walking, running, jumping or swimming, further revising the data of the bra cup and other key parts of the brassiere;

S8: selecting time period of the day and space scene;

S9: selecting wearing scene, e.g. swimwear, underwear, night skirt, dress, skirt, business suit or cheongsam;

S10: finishing the brassiere design by the virtual reality application program;

S11: revising the brassiere design according to a virtual fitting effect;

S12: inviting the designer or friends to enter the virtual reality environment and assist with the brassiere design;

S13: saving the data; and

S14: finishing manufacturing the expected brassiere by means of bidding.

DETAILED DESCRIPTION OF ILLUSTRATED EMBODIMENTS

The present invention will be further explained below in detail with reference to figures.

Referring to FIGS. 1 to 9, the disclosure provides a virtual reality system for designing brassiere, which makes it possible for a user to experience the effects of tightened or loosened brassiere, uplifting, compression, enlargement of the breast, and breast massage in a virtual reality environment with physical interaction with objects in real world. Afterwards, relevant data will be transferred to a cloud server via a built-in transducer, and an expected brassiere will be designed.

Figure 1:
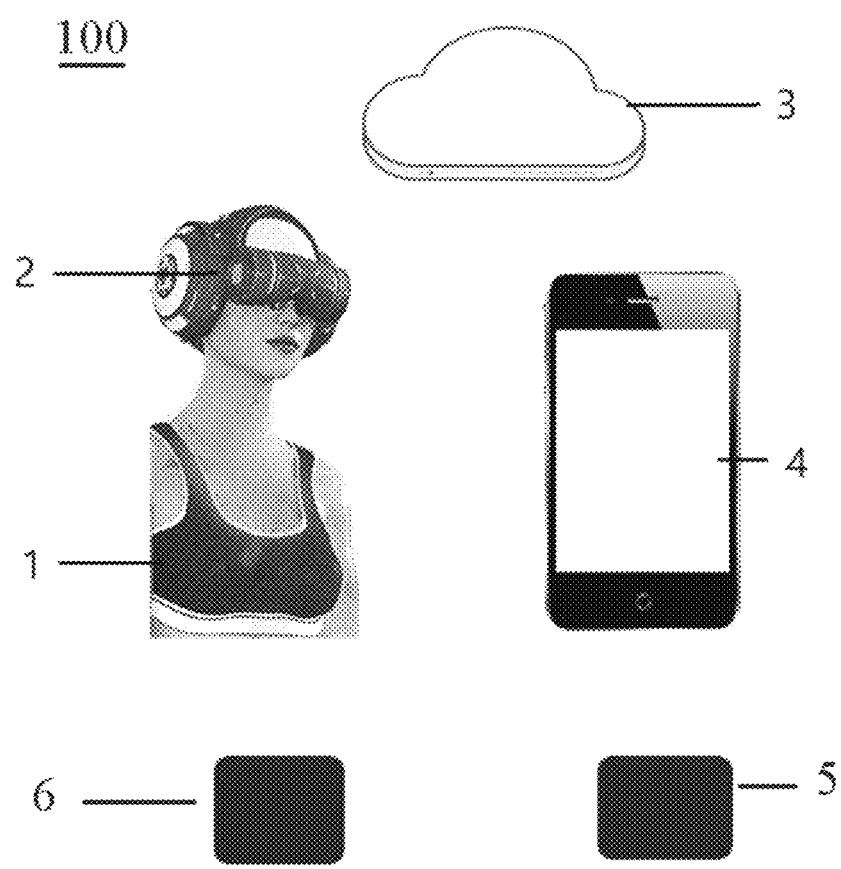
FIG. 1 is a schematic drawing of a virtual reality system for designing brassiere according to an embodiment of the present invention.

Referring to FIG. 1, the virtual reality system for designing brassiere 100 comprises a wearable device 1, a head-mounted device 2, a cloud server 3, an intelligent terminal 4, an application program 5 and a designer 6.

Figure 2:
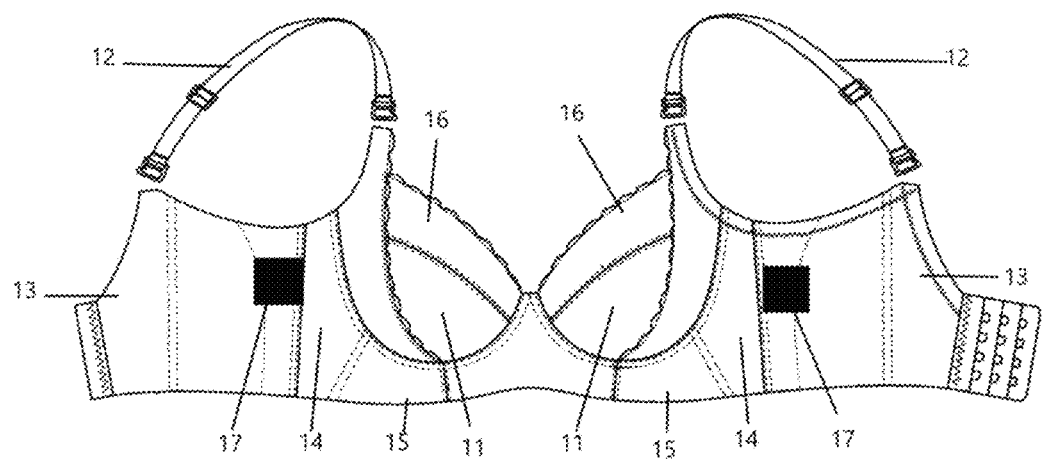
FIG. 2 is a schematic drawing of a wearable device according to an embodiment of the present invention.

Referring to FIG. 2, the wearable device 1 is a bra-like wearable device comprising bra cups 11, top bindings 16, bottom bindings 15, side wings 14, shoulder straps 12, back wings 13 and independently controllable air charging-discharging mechanisms 17. The wearable device 1 has different sizes for different users.

Figure 3:
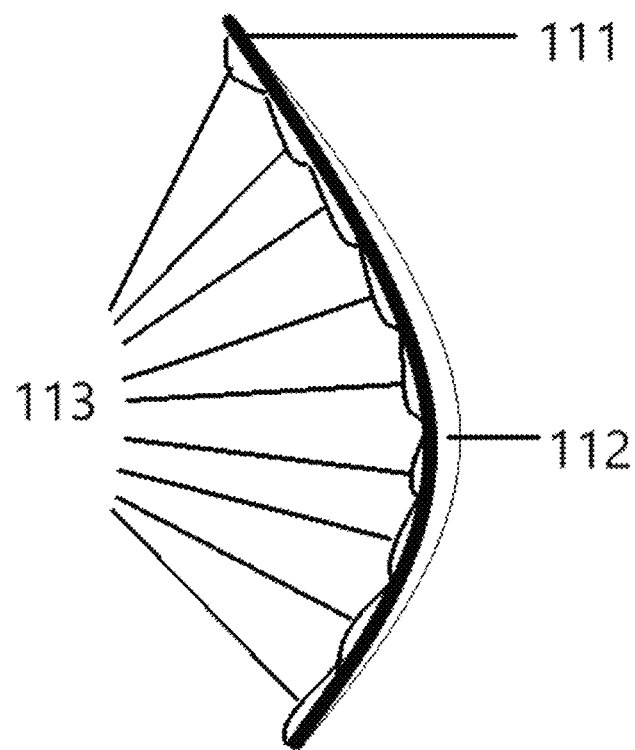
FIG. 3 is a cross-sectional view of a bra cup of the wearable device according to an embodiment of the present invention.

Referring to FIG. 3, the bra cup 11 comprises a main body 111, an external air bag 112 arranged on an external surface of the main body 111, and an array of internal air bags 113 arranged on an internal surface of the main body 111. The bra cup 11 has different sizes for different breast sizes.

The main body 111 is made of silicone rubber. Hardness of the silicone rubber ranges from 50 to 70. Thickness of the main body ranges from 0.5 mm to 2 mm. Also, the main body 111 may be made of plastic, resin, wood or paperboard.

Figure 4:
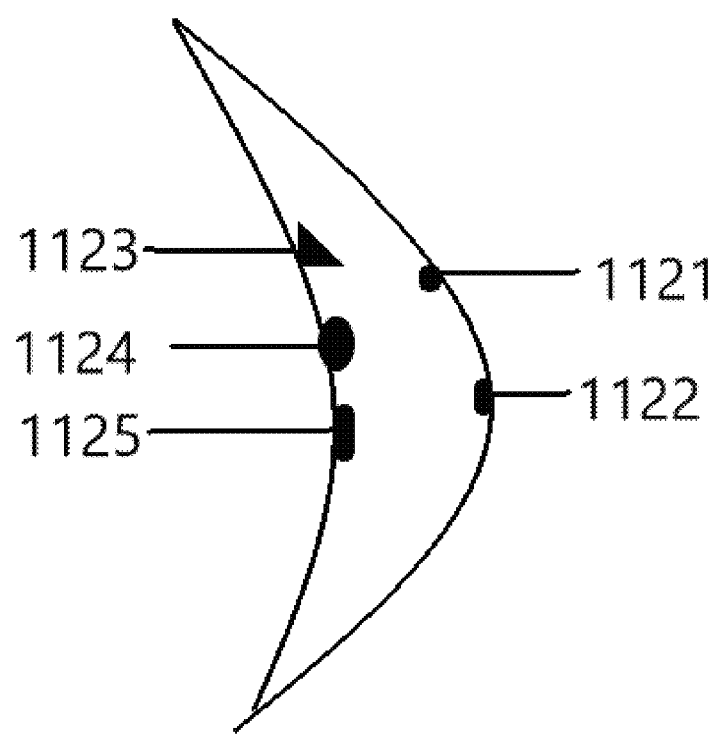
FIG. 4 is a cross-sectional view of an external air bag arranged on an external surface of a main body of the bra cup of the wearable device according to an embodiment of the present invention.

Referring to FIG. 4, the external air bag 112 is arranged on the external surface of the main body 111. A wall of the external bag 112 is made of polyurethane rubber. Thickness of the wall of the external air bag 112 ranges from 0.05 mm to 0.1 mm. The external air bag 112 is connected to the independently controllable air charging-discharging mechanism 17. A displacement sensor 1122 and a space positioning sensor 1121 are internally arranged on a front side of the wall of the external air bag 112. The displacement sensor 1122 and the space positioning sensor 1121 are configured to simulate the effects of breast enlargement and breast asymmetry correction. A pressure sensor 1123, a heart rate sensor 1124 and a respiration sensor 1125 are internally arranged on a back side of the wall of the external air bag 112. The pressure sensor 1123, the heart rate sensor 1124 and the respiration sensor 1125 are configured to monitor the wearable device's influence on cardiopulmonary function of the user. Through specific algorithm, it is possible to judge whether the user is satisfied with the brassiere design. Also, the wall of the external air bag 112 may be made of natural rubber or silicone rubber.

Figure 5:
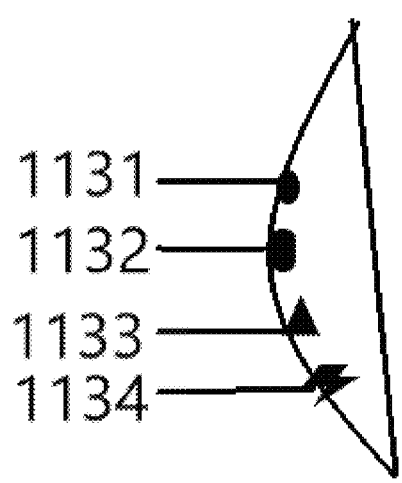
FIG. 5 is a cross-sectional view of an internal air bag arranged on an internal surface of the main body of the bra cup of the wearable device according to an embodiment of the present invention.

Referring to FIG. 5, the array of internal air bags 113 is arranged on the internal surface of the main body 111. Diameter of the internal air bag 113 ranges from 5 mm to 20 mm. A wall of the internal air bag 113 is made of polyurethane rubber. Thickness of the wall of the internal air bag 113 ranges from 0.02 mm to 0.05 mm. The internal air bag 113 is connected to the independently controllable air charging-discharging mechanism 17. A pressure sensor 1131, a displacement sensor 1132 and a space positioning sensor 1133 are internally arranged on a back side of a wall of the internal air bag 113. The pressure sensor 1131, the displacement sensor 1132 and the space positioning sensor 1133 are configured to simulate the effects of tightened or loosened brassiere, uplifting, compression, enlargement of the breast, and breast massage. Also, the wall of the internal air bag 113 may be made of natural rubber or silicone rubber.

Figure 6:
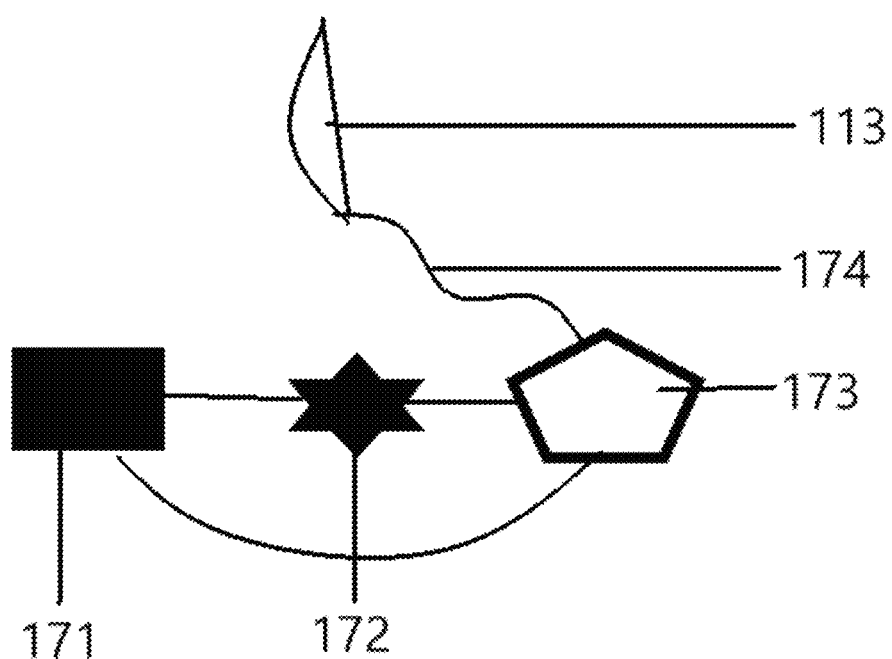
FIG. 6 is a schematic drawing of an independently controllable air charging-discharging mechanism of the wearable device according to an embodiment of the present invention.

Referring to FIG. 6, the independently controllable air charging-discharging mechanism 17 comprises a power supply 171, a control circuit 172, an air pump 173 and an air channel 174. The control circuit 172 receives instruction from the user via a wireless communication module, and controls the air pump 173, so as to charge or discharge the external air bag 112 and the internal air bags 113. The instruction from the user is sent by means of user-machine interaction in the virtual reality environment.

The top bindings 16, bottom bindings 15, side wings 14, shoulder straps 12 and back wings 13 are made of elastic fabric and are internally arranged with pressure sensors configured to record data related to the force applied on corresponding parts of the user's body. By combining the data and lengths of the top bindings 16, bottom bindings 15, side wings 14, shoulder straps 12 and back wings 13, it is possible to calculate suitable sizes of the top bindings 16, bottom bindings 15, side wings 14, shoulder straps 12 and back wings 13 for the user through specific algorithm. The width, material and appearance of the shoulder straps 12, back wings 13 and side wings 14 can be selected by the user.

The head-mounted device 2 comprises a smart display helmet, a pair of smart glasses and accessories.

The smart terminal 4 may be a smart phone, a smart tablet, a computer, a smart household appliance, a smart car, a smart mirror or a piece of intelligent furniture.

The cloud server 3 in configured to provide stored data, process data collected by the wearable device 1 and the head-mounted device 2, match scene, transfer data, encrypt data and produce a brassiere design plan for the user.

The application program 5 comprises a virtual reality application program and a smart terminal application program. The virtual reality application program is configured to establish and update database of space scenes and wearing scenes. The space scenes may be bedroom, living room, ballroom, office, workshop, grassland, beach or transport scene. The wearing scenes may be swimwear, underwear, night skirt, dress, skirt, business suit or cheongsam. The smart terminal application program is configured to collect 3D human body data of the user and communicate with a designer and a manufacturer. The 3D human body data comprises height, weight, age, somatotype, BWH (bust, waist, hip) measurements and breast type.

The designer 6 may be a human designer or an artificial intelligence designer, who assists the user with the brassiere design, e.g. brassiere structure optimizing, selection of material, color, pattern and accessories.

Figure 7:
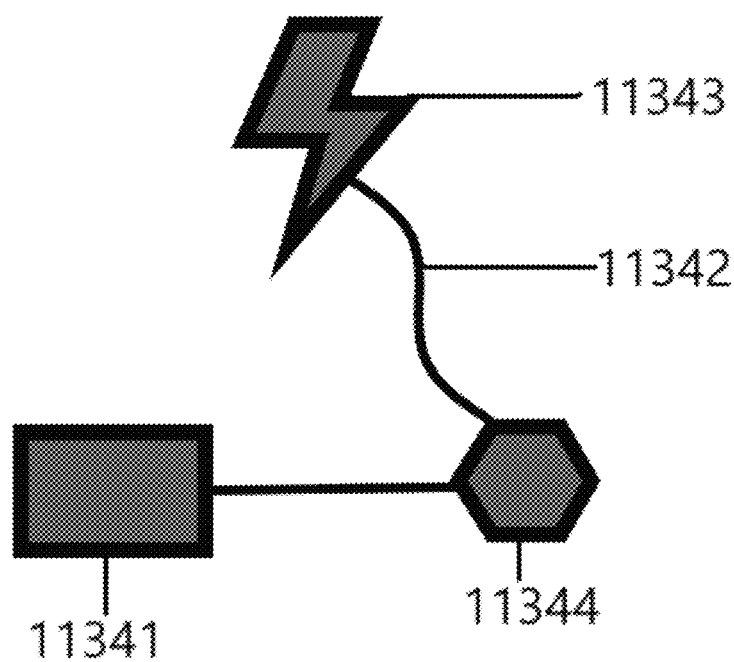
FIG. 7 is a schematic drawing of an electrode chip internally arranged on a back side of a wall of the internal air bag of the bra cup of the wearable device according to an embodiment of the present invention.

Referring to FIG. 5 and FIG. 7, an electrode chip 1134 is internally arranged on the back side of the wall of the internal air bag 113. The electrode chip 1134 comprises a power supply 11341, a circuit 11342, an electrode 11343 and a control chip 11344. The electrode chip 1134 touches skin of the user's breast and simulates the effects of water permeation, air permeation, sweating, and high or low body temperature.

The wearable device 1 connects with the head-mounted device 2 via the wireless communication module, so as to realize user-machine interaction. The user-machine interaction may be achieved by voice, gesture, eye tracking or brain-machine interface.

Figure 8:
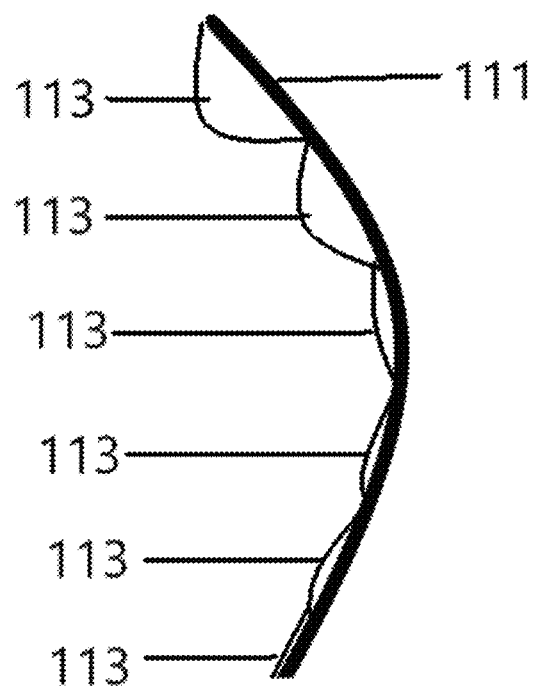
FIG. 8 is another cross-sectional view of the bra cup of the wearable device according to another embodiment of the present invention, showing that multiple upper internal air bags are air-charged, while multiple lower internal air bags are not air-charged.
Figure 9:
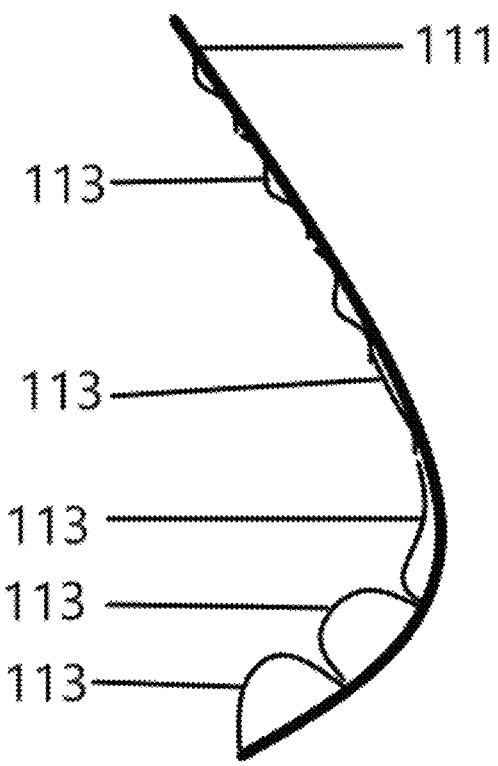
FIG. 9 is another partial sectional view of the bra cup of the wearable device according to another embodiment of the present invention, showing that multiple lower internal air bags are air-charged, while multiple upper internal air bags are not air-charged.

Referring to FIG. 8, multiple upper internal air bags 113 are air-charged, while multiple lower internal air bags 113 are not air-charged, which simulates the effects of compression of the breast. Referring to FIG. 9, multiple lower internal air bags 113 are air-charged, while multiple upper internal air bags 113 are not air-charged, which simulates the effects of uplifting and sagging correction of the breast. When the array of internal air bags 113 is air-charged or air-discharged orderly or disorderly, the effects of breast massage are simulated.

The displacement sensor 1122 and the space positioning sensor 1121 internally arranged on the front side of the wall of the external air bag 112 output data and receive data related to characters of an external half of the bra cup 11, while the pressure sensors 1131, the displacement sensors 1132 and the space positioning sensors 1133 internally arranged on the back sides of the walls of the internal air bags 113 output data and receive data related to characters of an internal half of the bra cup 11. The data related to characters of the external half and the internal half of the bra cup 11 enables establishment of a 3D model of the bra cup 11, e.g. relatively thin bra cup, moderately thick bra cup, bra cup with relatively thin upper part and relatively thick lower part, bra cup with relatively thin upper part, relatively thick lower part and relatively thick side edge.

Further, the virtual reality application program comprises the step of inviting the designer 6 or friends to enter the virtual reality environment and assist with the brassiere design, wherein the designer 6 or friends wear the head-mounted device 2 or use the mobile smart terminal 4 to realize user-machine interaction by means of wireless communication connection and assist with the brassiere design.

Further, the virtual reality application program comprises an intelligent recommendation module and a demand-based fuzzy recommendation module. Through specific algorithm, the intelligent recommendation module recommends one or more brassiere design plans for the user based on data, e.g. the 3D human body data provided by the user, the user's previous brassiere design data, data related to the user's online purchased brassiere, selected space scene and selected wearing scene. The demand-based fuzzy recommendation module recommends one or more brassiere design plans for the user based on the user's demand. The user can express her demand by voice, gesture, eye tracking, text entry, image entry or image recognition. The demand may relate to style, factor, meaning and conception of the brassiere design.

Further, the smart terminal application program comprises the step that the user shares the brassiere design, requests for advice from friends, participates in a brassiere design competition and releases bidding information, and steps of finishing the entrusted brassiere design project and manufacturing the brassiere.

Figure 10:
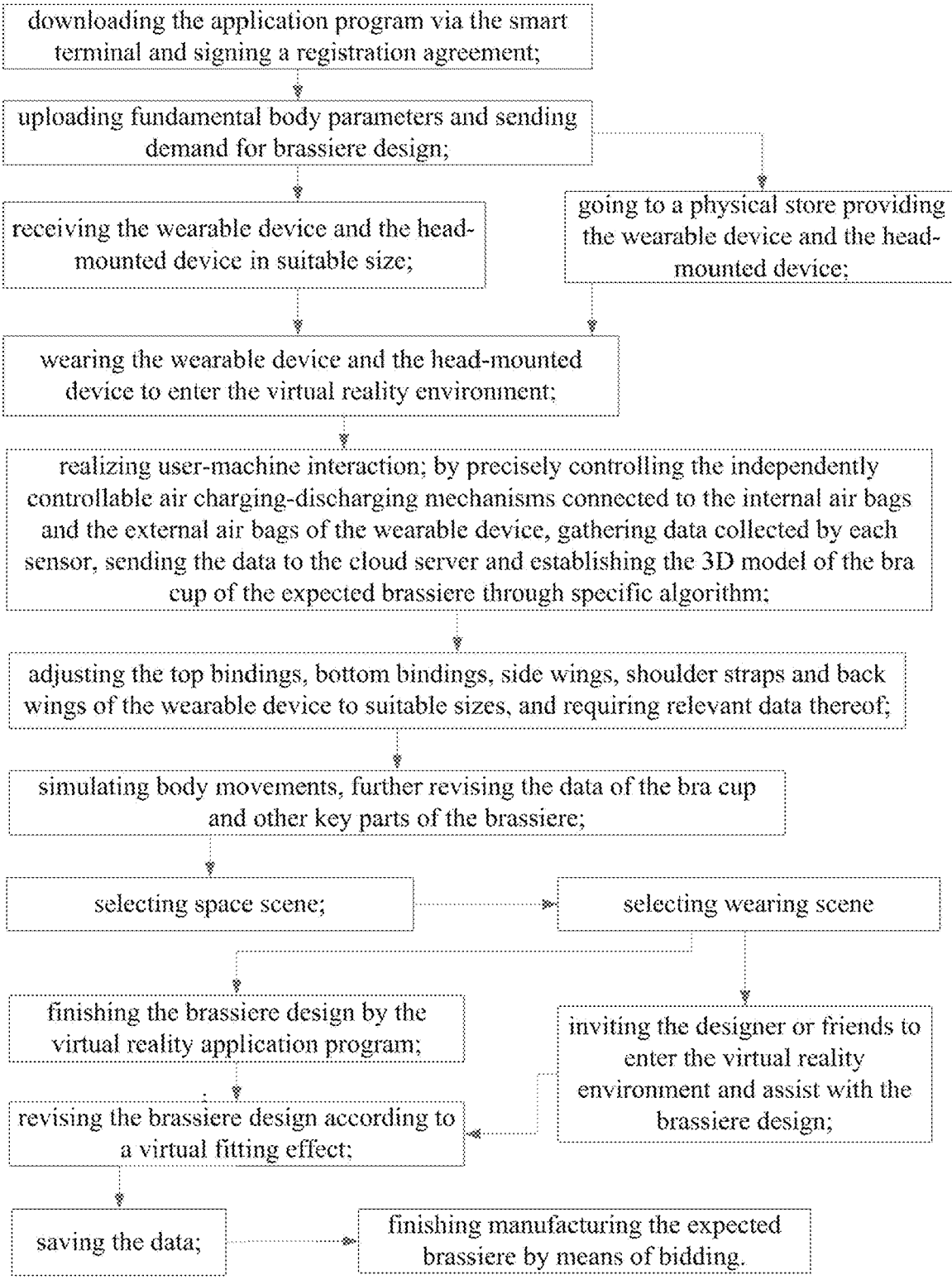
FIG. 10 is a flowchart showing the procedure of designing a brassiere according to an embodiment of the present invention.

Referring to FIG. 10, the procedure of designing an expected brassiere comprises the following steps.

S1: downloading the application program via the smart terminal and signing a registration agreement;

S2: uploading fundamental body parameters and sending demand for brassiere design;

S3: receiving the wearable device and the head-mounted device in suitable size, or going to a physical store providing the wearable device and the head-mounted device;

S4: wearing the wearable device and the head-mounted device to enter the virtual reality environment;

S5: realizing user-machine interaction; by precisely controlling the independently controllable air charging-discharging mechanisms connected to the internal air bags and the external air bags of the wearable device, gathering data collected by each sensor, sending the data to the cloud server and establishing the 3D model of the bra cup of the expected brassiere through specific algorithm;

S6: adjusting the top bindings, bottom bindings, side wings, shoulder straps and back wings of the wearable device to suitable sizes, and requiring relevant data thereof;

S7: simulating body movements, e.g. standing, sitting, lying, squatting, walking, running, jumping or swimming, further revising the data of the bra cup and other key parts of the brassiere;

S8: selecting time period of the day and space scene;

S9: selecting wearing scene, e.g. swimwear, underwear, night skirt, dress, skirt, business suit or cheongsam;

S10: finishing the brassiere design by the virtual reality application program;

S11: revising the brassiere design according to a virtual fitting effect;

S12: inviting the designer or friends to enter the virtual reality environment and assist with the brassiere design;

S13: saving the data; and

S14: finishing manufacturing the expected brassiere by means of bidding.

All the above are merely the preferred embodiments of the present invention, but are not to limit the invention in any form. The present invention is intended to cover all changes, various modifications and equivalent arrangements included within scope of the present invention.

What is claimed is:

1. A virtual reality system for designing brassiere, comprising a wearable device, a head-mounted device, a cloud server, an intelligent terminal, an application program and a designer;

the wearable device is a bra-like wearable device comprising bra cups, top bindings, bottom bindings, side wings, shoulder straps, back wings and independently controllable air charging-discharging mechanisms;

the bra cup comprises a main body, an external air bag and an array of internal air bags;

the external air bag is arranged on an external surface of the main body and is connected to the independently controllable air charging-discharging mechanism; a displacement sensor and a space positioning sensor are internally arranged on a front side of a wall of the external air bag; a pressure sensor, a heart rate sensor and a respiration sensor are internally arranged on a back side of the wall of the external air bag;

the array of internal air bags is arranged on an internal surface of the main body and is connected to the independently controllable air charging-discharging mechanism; a pressure sensor, a displacement sensor and a space positioning sensor are internally arranged on a back side of a wall of the internal air bag;

the top bindings, bottom bindings, side wings, shoulder straps and back wings are made of elastic fabric and are internally arranged with pressure sensors;

the independently controllable air charging-discharging mechanism comprises a power supply, a control circuit, an air pump and an air channel; the control circuit receives instruction from the user via a wireless communication module, and controls the air pump;

the head-mounted device comprises a smart display helmet, a pair of smart glasses and accessories.

2. The virtual reality system for designing brassiere according to claim 1, wherein diameter of the internal air bag ranges from 5 mm to 20 mm; the wall of the internal air bag is made of polyurethane rubber; thickness of the wall of the internal air bag ranges from 0.02 mm to 0.05 mm;

an electrode chip is internally arranged on the back side of the wall of the internal air bag; the electrode chip comprises a power supply, a circuit, an electrode and a control chip.

3. The virtual reality system for designing brassiere according to claim 1, wherein the wall of the external bag is made of polyurethane rubber; thickness of the wall of the external air bag ranges from 0.05 mm to 0.1 mm;

the displacement sensor and the space positioning sensor internally arranged on the front side of the wall of the external air bag output data and receive data related to characters of an external half of the bra cup, while the pressure sensors, the displacement sensors and the space positioning sensors internally arranged on the back sides of the walls of the internal air bags output data and receive data related to characters of an internal half of the bra cup; the data related to characters of the external half and the internal half of the bra cup enables establishment of a 3D model of the bra cup.

4. The virtual reality system for designing brassiere according to claim 1, wherein the cloud server is configured to provide stored data, process data collected by the wearable device and the head-mounted device, match scene, transfer data, encrypt data and produce a brassiere design plan for the user.

5. The virtual reality system for designing brassiere according to claim 1, wherein the application program comprises a virtual reality application program and a smart terminal application program; the virtual reality application program is configured to establish and update database of space scenes and wearing scenes; the smart terminal application program is configured to collect 3D human body data of the user and communicate with a designer and a manufacturer.

6. The virtual reality system for designing brassiere according to claim 1, wherein the wearable device connects with the head-mounted device via the wireless communication module and thus realizing user-machine interaction; the user-machine interaction is achieved by voice, gesture, eye tracking or brain-machine interface.

7. The virtual reality system for designing brassiere according to claim 1, wherein the virtual reality application program comprises the step of inviting the designer or friends to enter the virtual reality environment and assist with the brassiere design, wherein the designer or friends wear the head-mounted device or use the mobile smart terminal to realize user-machine interaction by means of wireless communication connection and assist with the brassiere design.

8. The virtual reality system for designing brassiere according to claim 1, wherein the virtual reality application program comprises an intelligent recommendation module and a demand-based fuzzy recommendation module.

9. The virtual reality system for designing brassiere according to claim 8, wherein through specific algorithm, the intelligent recommendation module recommends one or more brassiere design plans for the user based on the 3D human body data provided by the user, the user's previous brassiere design data, data related to the user's online purchased brassiere, selected space scene and selected wearing scene; the demand-based fuzzy recommendation module recommends one or more brassiere design plans for the user based on the user's demand; the user expresses her demand by voice, gesture, eye tracking, text entry, image entry or image recognition; the demand relate to style, factor, meaning and conception of the brassiere design.

10. The virtual reality system for designing brassiere according to claim 1, wherein the smart terminal application program comprises the step that the user shares the brassiere design, requests for advice from friends, participates in a brassiere design competition and releases bidding information, and steps of finishing the entrusted brassiere design project and manufacturing the brassiere.

11. The virtual reality system for designing brassiere according to claim 1, wherein the procedure of designing an expected brassiere comprises the following steps:

S1: downloading the application program via the smart terminal and signing a registration agreement;

S2: uploading fundamental body parameters and sending demand for brassiere design;

S3: receiving the wearable device and the head-mounted device in suitable size, or going to a physical store providing the wearable device and the head-mounted device;

S4: wearing the wearable device and the head-mounted device to enter the virtual reality environment;

S5: realizing user-machine interaction; by precisely controlling the independently controllable air charging-discharging mechanisms connected to the internal air bags and the external air bags of the wearable device, gathering data collected by each sensor, sending the data to the cloud server and establishing the 3D model of the bra cup of the expected brassiere through specific algorithm;

S6: adjusting the top bindings, bottom bindings, side wings, shoulder straps and back wings of the wearable device to suitable sizes, and requiring relevant data thereof;

S7: simulating body movements, further revising the data of the bra cup and other key parts of the brassiere;

S8: selecting space scene;

S9: selecting wearing scene;

S10: finishing the brassiere design by the virtual reality application program;

S11: revising the brassiere design according to a virtual fitting effect;

S12: inviting the designer or friends to enter the virtual reality environment and assist with the brassiere design;

S13: saving the data; and

S14: finishing manufacturing the expected brassiere by means of bidding.

* * * * *